(12) United States Patent
Guterman et al.

(10) Patent No.: US 9,203,137 B1
(45) Date of Patent: Dec. 1, 2015

(54) ELECTRONIC DEVICE WITH ISOLATED CAVITY ANTENNAS

(71) Applicant: Apple Inc., Cupertino, CA (US)

(72) Inventors: Jerzy Guterman, Mountain View, CA (US); Edward T. Sweet, San Francisco, CA (US); Huan-Chu Huang, Luzhu (TW); Daniel K. Boothe, San Franicsco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/733,855

(22) Filed: Jun. 8, 2015

Related U.S. Application Data

(63) Continuation of application No. 14/640,787, filed on Mar. 6, 2015.

(51) Int. Cl.
*H01Q 1/24* (2006.01)
*H01Q 1/22* (2006.01)
*H01Q 5/20* (2015.01)
*H01Q 5/10* (2015.01)

(52) U.S. Cl.
CPC .............. *H01Q 1/2266* (2013.01); *H01Q 5/10* (2015.01); *H01Q 5/20* (2015.01)

(58) Field of Classification Search
USPC ........................................ 343/700 MS, 702
See application file for complete search history.

(56) References Cited

U.S. PATENT DOCUMENTS

| | | | |
|---|---|---|---|
| 4,509,056 A | 4/1985 | Ploussios | |
| 5,258,892 A | 11/1993 | Stanton et al. | |
| 5,463,406 A | 10/1995 | Vannatta et al. | |
| 5,608,413 A | 3/1997 | Macdonald | |
| 5,784,032 A | 7/1998 | Johnston et al. | |
| 5,917,458 A | 6/1999 | Ho et al. | |
| 6,184,845 B1 | 2/2001 | Leisten et al. | |
| 6,272,356 B1 * | 8/2001 | Dolman | H01Q 1/084 343/702 |

(Continued)

FOREIGN PATENT DOCUMENTS

| | | |
|---|---|---|
| EP | 1083622 | 3/2001 |
| EP | 1 739 785 | 1/2007 |

(Continued)

OTHER PUBLICATIONS

Guterman et al., U.S. Appl. No. 14/202,860, filed Mar. 10, 2015.

(Continued)

*Primary Examiner* — Tan Ho
(74) *Attorney, Agent, or Firm* — Treyz Law Group, P.C.; G. Victor Treyz; Michael H. Lyons

(57) ABSTRACT

An electronic device may have a metal housing. The metal housing may have an upper housing in which a component such as a display is mounted and a lower housing in which a component such as a keyboard is mounted. Hinges may be used to mount the upper housing to the lower housing for rotation about a rotational axis. A slot-shaped opening may separate the upper and lower housing. A flexible printed circuit with ground traces may bisect the slot-shaped opening to form first and second slots. Cavity antennas may be aligned with the slots. Each cavity antenna may include a hollow carrier with a pair of speakers. The speakers may have ports that emit sound through aligned openings in the lower housing. Conductive gaskets surrounding the ports may acoustically seal the speaker ports while shorting the cavity antenna to the lower housing.

20 Claims, 16 Drawing Sheets

(56) References Cited

U.S. PATENT DOCUMENTS

| | | | |
|---|---|---|---|
| 6,301,489 B1 | 10/2001 | Winstead et al. |
| 6,307,512 B1 | 10/2001 | Geeraert |
| 6,380,899 B1 | 4/2002 | Madsen et al. |
| 6,392,605 B2 | 5/2002 | Anterow |
| 6,392,610 B1 | 5/2002 | Braun et al. |
| 6,414,643 B2 | 7/2002 | Cheng et al. |
| 6,421,029 B1 | 7/2002 | Tanabe |
| 6,448,942 B2 | 9/2002 | Weinberger et al. |
| 6,456,249 B1 | 9/2002 | Johnson |
| 6,486,836 B1 | 11/2002 | Hill |
| 6,539,608 B2 | 4/2003 | McKinnon et al. |
| 6,552,692 B1 | 4/2003 | Zeilinger et al. |
| 6,570,538 B2 | 5/2003 | Vaisanen et al. |
| 6,614,400 B2 | 9/2003 | Egorov |
| 6,636,181 B2 | 10/2003 | Asano et al. |
| 6,639,558 B2 | 10/2003 | Kellerman et al. |
| 6,667,719 B2 | 12/2003 | LaKomski |
| 6,781,546 B2 | 8/2004 | Wang et al. |
| 6,791,506 B2 | 9/2004 | Suganthan et al. |
| 6,819,287 B2 | 11/2004 | Sullivan et al. |
| 6,847,329 B2 | 1/2005 | Ikegaya et al. |
| 6,861,989 B2 | 3/2005 | Morningstar et al. |
| 6,987,485 B2 | 1/2006 | Ito et al. |
| 7,053,850 B1 | 5/2006 | Bogdans et al. |
| 7,068,229 B2 | 6/2006 | Lin |
| 7,181,172 B2 | 2/2007 | Sullivan et al. |
| 7,183,983 B2 | 2/2007 | Ozden |
| 7,339,530 B2 | 3/2008 | Ying et al. |
| 7,345,646 B1 | 3/2008 | Lin et al. |
| 7,447,530 B2 | 11/2008 | Iwai et al. |
| 7,551,142 B1 | 6/2009 | Zhang et al. |
| 7,595,759 B2 | 9/2009 | Schlub et al. |
| 7,639,190 B2 | 12/2009 | Shimasaki et al. |
| 7,705,789 B2 | 4/2010 | Suzuki et al. |
| 7,750,854 B2 | 7/2010 | Wedel et al. |
| 7,768,461 B2 | 8/2010 | Cheng et al. |
| 7,768,462 B2 | 8/2010 | Zhang et al. |
| 7,804,458 B2 | 9/2010 | Montgomery et al. |
| 7,916,089 B2 | 3/2011 | Schlub et al. |
| 8,059,039 B2 | 11/2011 | Ayala Vazquez et al. |
| 8,059,040 B2 | 11/2011 | Ayala Vazquez et al. |
| 8,264,412 B2 | 9/2012 | Ayala Vazquez et al. |
| 8,269,675 B2 | 9/2012 | Kough et al. |
| 8,319,692 B2 | 11/2012 | Chiang et al. |
| 8,325,094 B2 | 12/2012 | Ayala Vazquez et al. |
| 8,325,096 B2 | 12/2012 | Ayala Vazquez et al. |
| 8,482,469 B2 | 7/2013 | Ayala Vazquez et al. |
| 8,638,549 B2 | 1/2014 | Garelli et al. |
| 2001/0040529 A1 | 11/2001 | Cheng |
| 2002/0024469 A1 | 2/2002 | Masaki |
| 2002/0080565 A1 | 6/2002 | Teshima |
| 2002/0163473 A1 | 11/2002 | Koyama |
| 2003/0222823 A1 | 12/2003 | Flint et al. |
| 2004/0051670 A1 | 3/2004 | Sato |
| 2004/0219956 A1 | 11/2004 | Iwai et al. |
| 2004/0257283 A1 | 12/2004 | Asano et al. |
| 2005/0041624 A1 | 2/2005 | Hui et al. |
| 2005/0062657 A1 | 3/2005 | Lin |
| 2006/0038736 A1 | 2/2006 | Hui et al. |
| 2006/0158379 A1 | 7/2006 | Ishimiya |
| 2006/0238437 A1 | 10/2006 | Huang |
| 2006/0244663 A1 | 11/2006 | Fleck et al. |
| 2007/0069958 A1 | 3/2007 | Ozkar |
| 2007/0126651 A1 | 6/2007 | Snyder et al. |
| 2007/0140072 A1 | 6/2007 | Agrawal et al. |
| 2008/0018542 A1 | 1/2008 | Yamazaki et al. |
| 2008/0106478 A1 | 5/2008 | Hill |
| 2008/0143611 A1 | 6/2008 | Wang |
| 2008/0166004 A1 | 7/2008 | Sanford et al. |
| 2008/0258992 A1 | 10/2008 | Tsai et al. |
| 2009/0051604 A1 | 2/2009 | Zhang et al. |
| 2009/0153411 A1 | 6/2009 | Chiang et al. |
| 2009/0174611 A1 | 7/2009 | Schlub et al. |
| 2009/0174612 A1 | 7/2009 | Ayala et al. |
| 2009/0243943 A1 | 10/2009 | Mumbru et al. |
| 2009/0273529 A1 | 11/2009 | Liu |
| 2010/0073241 A1 | 3/2010 | Ayala Vazquez et al. |
| 2010/0073242 A1 | 3/2010 | Ayala Vazquez et al. |
| 2010/0073243 A1 | 3/2010 | Vazquez et al. |
| 2010/0134361 A1 | 6/2010 | Nakano |
| 2010/0156741 A1 | 6/2010 | Vazquez et al. |
| 2010/0182205 A1 | 7/2010 | Chiang |
| 2010/0321255 A1* | 12/2010 | Kough ............ H01Q 1/2266 343/702 |
| 2011/0080703 A1* | 4/2011 | Schlesener ......... G06F 1/1616 361/679.27 |
| 2012/0026048 A1 | 2/2012 | Vazquez et al. |
| 2012/0068893 A1* | 3/2012 | Guterman ........... H01Q 1/2266 343/702 |
| 2012/0074988 A1 | 3/2012 | Lashkari et al. |
| 2012/0169550 A1 | 7/2012 | Schlub et al. |
| 2013/0003284 A1 | 1/2013 | Massaro et al. |
| 2013/0009833 A1 | 1/2013 | Kough et al. |
| 2013/0050032 A1 | 2/2013 | Shiu et al. |
| 2013/0127669 A1 | 5/2013 | Han et al. |
| 2013/0293425 A1 | 11/2013 | Zhu et al. |
| 2013/0321216 A1 | 12/2013 | Jervis et al. |
| 2014/0361932 A1* | 12/2014 | Irci ................. H01Q 1/243 343/702 |

FOREIGN PATENT DOCUMENTS

| | | |
|---|---|---|
| JP | 2000004120 | 7/2000 |
| JP | 2004363848 | 12/2004 |
| JP | 2006527941 | 12/2006 |
| TW | 200843205 | 11/2008 |
| WO | 2005 120164 | 12/2002 |
| WO | 2004112187 | 12/2004 |
| WO | 2006018711 | 2/2006 |
| WO | 2009142000 | 11/2009 |

OTHER PUBLICATIONS

"AirPort Product-Specific Details", AirPort Developer Note, [Online], Updated: Apr. 28, 2008, Retrieved: Sep. 25, 2008, <http://developer.apple.com/documentation/HardwareDrivers/Conceptual/Hwrech__AirportjArticles/ElAirP__implementation.html>.

R. Brancroft, "A Commercial Perspective on the Development and Integration of an 802.11albig HiperLanNVLAN Antenna into Laptop Computers" Centurion Wireless Technologies, IEEE: ArtOntlas end Propagvtion itlarreeino. vol. 48. No. 4, Aug. 2006.

Wikipedia contributors, "MacBook Pro," Wikipedia, The Free Encyclopedia, [online] <http://en.wikipedia.org/w/index.php?title=MacBook__Pro&oldid=506131750>, retrieved Aug. 7.

* cited by examiner

ELECTRONIC DEVICE WITH ISOLATED CAVITY ANTENNAS

This application is a continuation of patent application Ser. No. 14/640,787, filed Mar. 6, 2015, which is hereby incorporated by reference herein in its entirety.

BACKGROUND

This relates generally to electronic devices and, more particularly, to wireless electronic devices with antennas.

Electronic devices often include antennas. For example, cellular telephones, computers, and other devices often contain antennas for supporting wireless communications.

It can be challenging to form electronic device antenna structures with desired attributes. In some wireless devices, the presence of conductive housing structures can influence antenna performance. Antenna performance may not be satisfactory if the housing structures are not configured properly and interfere with antenna operation. Device size can also affect performance. It can be difficult to achieve desired performance levels in a compact device, particularly when the compact device has conductive housing structures.

It would therefore be desirable to be able to provide improved wireless circuitry for electronic devices.

SUMMARY

An electronic device may have a metal housing. The metal housing may have an upper housing portion such as a lid in which a component such as a display is mounted. The metal housing may have a lower housing portion such as a base housing containing a component such as a keyboard. Hinges may be used to mount the upper housing portion to the lower housing portion. The upper housing portion may be rotated relative to the lower housing portion using the hinges.

A slot-shaped opening may separate the upper and lower housing portions. The slot-shaped opening may be present both when the lid is open and when the lid is closed. A flexible printed circuit with ground traces may bisect the slot-shaped opening to form first and second slots. A first of the hinges and a first ground trace on the flexible printed circuit may form opposing ends of the first slot. A second of the hinges and a second ground trace on the flexible printed circuit may form opposing ends of the second slot. Signal traces on the flexible printed circuit may be interposed between the first and second ground traces.

Cavity antennas may be aligned with the slots, which serve as apertures for the antennas. Each cavity antenna may include a hollow carrier with a pair of speakers. The speakers may have ports that emit sound through aligned openings in the lower housing. Conductive gaskets surrounding the ports may acoustically seal the speaker ports while shorting the cavity antennas to the lower housing.

An angle sensor may be used to measure the angle between the upper housing portion and the lower housing portion. Control circuitry may tune the antennas using tunable circuitry. The control circuitry may tune the antennas based on measurements made using a lid angle sensor or other circuitry.

DETAILED DESCRIPTION

Figure 1:
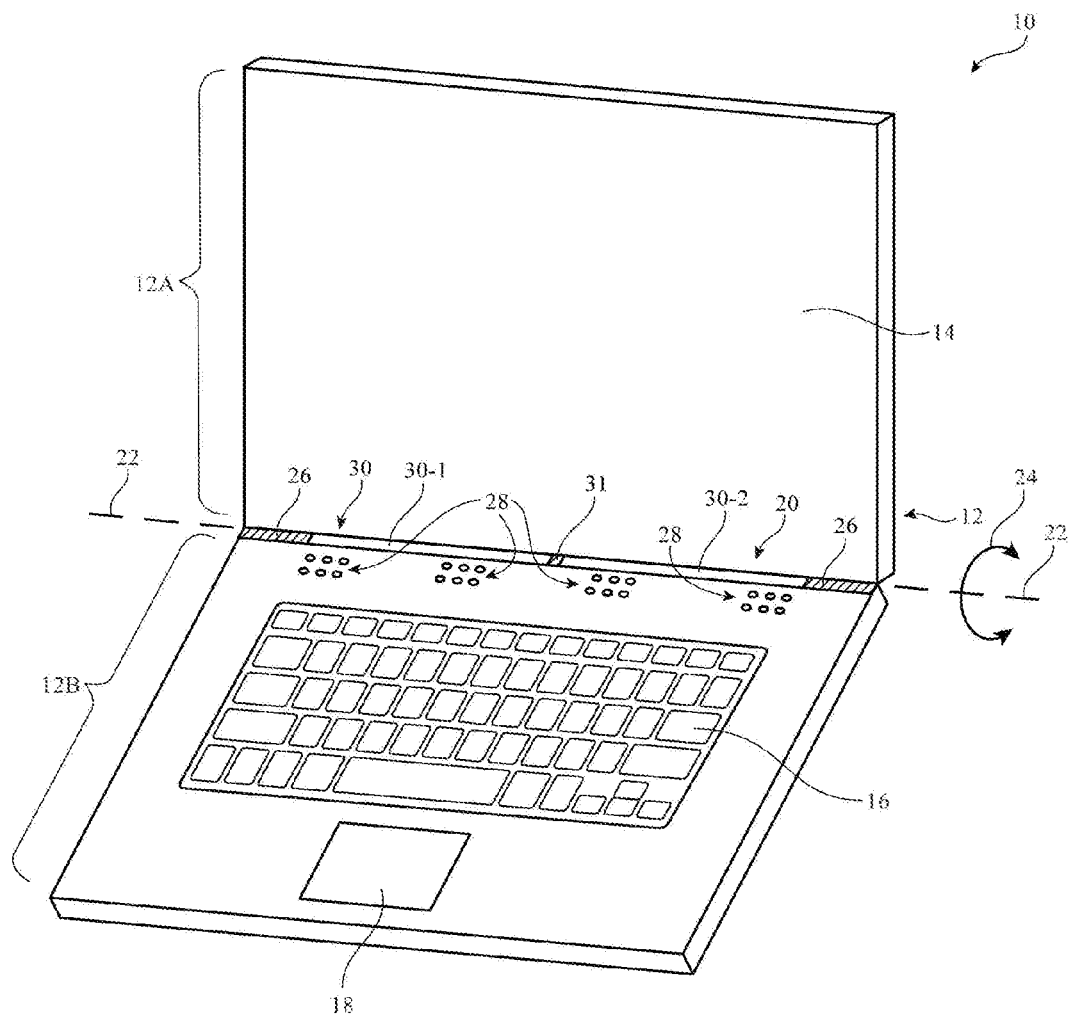
FIG. 1 is a perspective view of an illustrative electronic device such as a laptop computer in accordance with an embodiment.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications, communications at 60 GHz, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, or may be other electronic equipment. Configurations in which device 10 has a rotatable lid as in a portable computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multi-part housing constructions may also be used in which housing 12 or parts of housing 12 are formed from frame structures, housing walls, and other components that are attached to each other using fasteners, adhesive, and other attachment mechanisms.

Some of the structures in housing 12 may be conductive. For example, metal parts of housing 12 such as metal housing walls may be conductive. Other parts of housing 12 may be formed from dielectric material such as plastic, glass, ceramic, non-conducting composites, etc. To ensure that antenna structures in device 10 function properly, care should be taken when placing the antenna structures relative to the conductive portions of housing 12. If desired, portions of housing 12 may form part of the antenna structures for device 10. For example, conductive housing sidewalls may form all or part of an antenna ground. The antenna ground include one or more cavities for cavity-backed antennas. The cavities in the cavity-backed antennas may be formed from metal traces on dielectric carriers and may be electrically shorted to portions of housing 12 near a slot-shaped opening between the upper and lower portions of the housing.

As shown in FIG. 1, device 10 may have input-output devices such as track pad 18 and keyboard 16. Device 10 may also have components such as a camera, microphones, speakers, buttons, removable storage drives, status indicator lights, buzzers, sensors, and other input-output devices. These devices may be used to gather input for device 10 and may be used to supply a user of device 10 with output. Ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (i.e., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located in region 20 along the upper edge of lower housing 12B and the lower edge of upper housing 12A). For example, housings 12A and 12B may be coupled by hinges 26. Hinges 26 may be located at opposing left and right edges of housing 12 along hinge axis 22. A slot-shaped opening such as opening (slot) 30 may be formed between upper housing 12A and lower housing 12B and may be bordered on either end by hinges 26. Hinges 26, which may be formed from conductive structures such as metal structures, may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°, 140°, or more when the lid is fully opened.

Metal traces on one or more flexible printed circuits 31 may bisect slot 30 and thereby create two slots 30-1 and 30-2. Slots 30-1 and 30-2 may be surrounded by metal. For example, slots 30-1 and 30-2 may be surrounded by metal portions of housing 12A and 12B on their top and bottom edges and hinges 26 and flexible printed circuit traces on flexible printed circuit(s) 31 on their opposing ends). Slots 30-1 and 30-2 may serve as antenna apertures for respective antennas 40 in device 10. These antennas may be used to form a multiple-input-multiple-output (MIMO) antenna array.

Speakers in device 10 may be located within housing 12. Housing 12 may have perforations such as circular holes or may have other speaker openings to allow sound to exit the interior of device 10. Arrays of speaker openings (e.g., circular holes or other housing openings) may be formed on the left and right edges of housing 12B (e.g., in positions flanking the right and left sides of keyboard 16), may be formed along the upper edge of housing 12B adjacent to hinge region 20, or may be formed in other suitable locations. Device 10 may have one or more speakers, two or more speakers, three or more speakers, four or more speakers, or other suitable numbers of speakers. In the example of FIG. 1, speaker openings 28 have been formed in four groups (clusters) each of which overlaps a respective speaker in a group of four speakers that have been mounted within the interior of device 10. If desired, dummy openings (i.e., housing openings that do not overlap any speakers) may be formed within housing 12 between respective groups of speaker holes 28, so that housing 12B appears to have a single uninterrupted band of speaker perforations running along the upper edge of housing 12B near hinge axis 22. The configuration of FIG. 1 in which speaker openings 28 are formed in four different speaker locations is merely illustrative.

Figure 2:
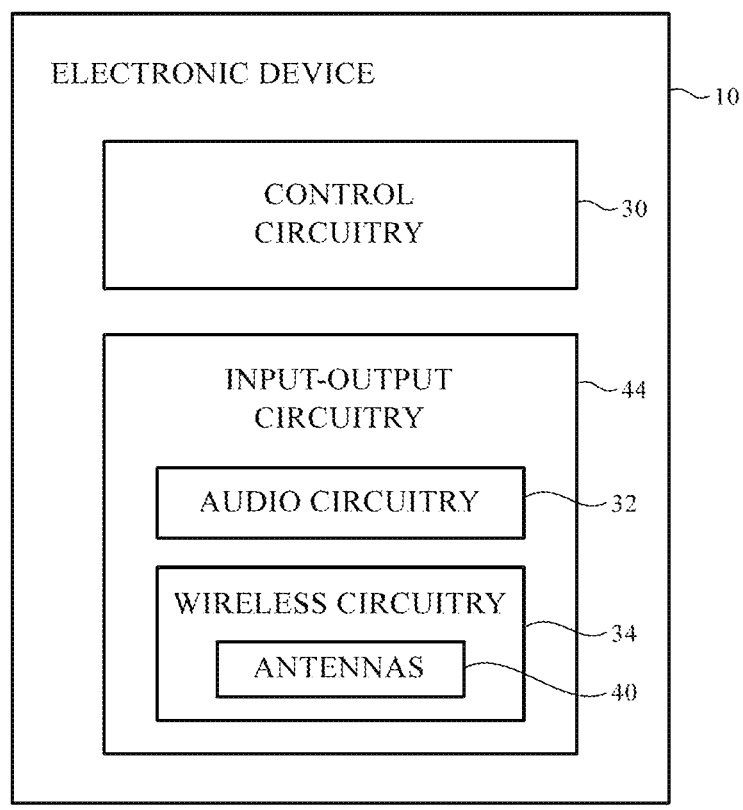
FIG. 2 is a schematic diagram of an illustrative electronic device with wireless circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices to allow data to be supplied to device 10 and to allow data to be provided from device 10 to external devices. Input-output devices in circuitry 44 may include user interface devices, data port devices, and other input-output components. For example, input-output devices in circuitry 44 may include touch screens, displays without touch sensor capabilities, buttons, joysticks, scrolling wheels, touch pads, key pads, keyboards, cameras, buttons, status indicators, light sources, audio jacks and other audio port components, digital data port devices, light sensors, motion sensors (accelerometers), capacitance sensors, proximity sensors, audio circuitry 32 such as microphones and speakers, and other components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry for handling voice data and non-voice data in various radio-frequency communications bands. For example, circuitry 34 may include wireless local area network transceiver circuitry to handle 2.4 GHz and 5 GHz bands for WiFi® (IEEE 802.11) communications and to handle the 2.4 GHz Bluetooth® communications band. Circuitry 34 may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples).

Wireless communications circuitry 34 may include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include satellite navigation system circuitry such as global positioning system (GPS) receiver circuitry for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna.

Figure 3:
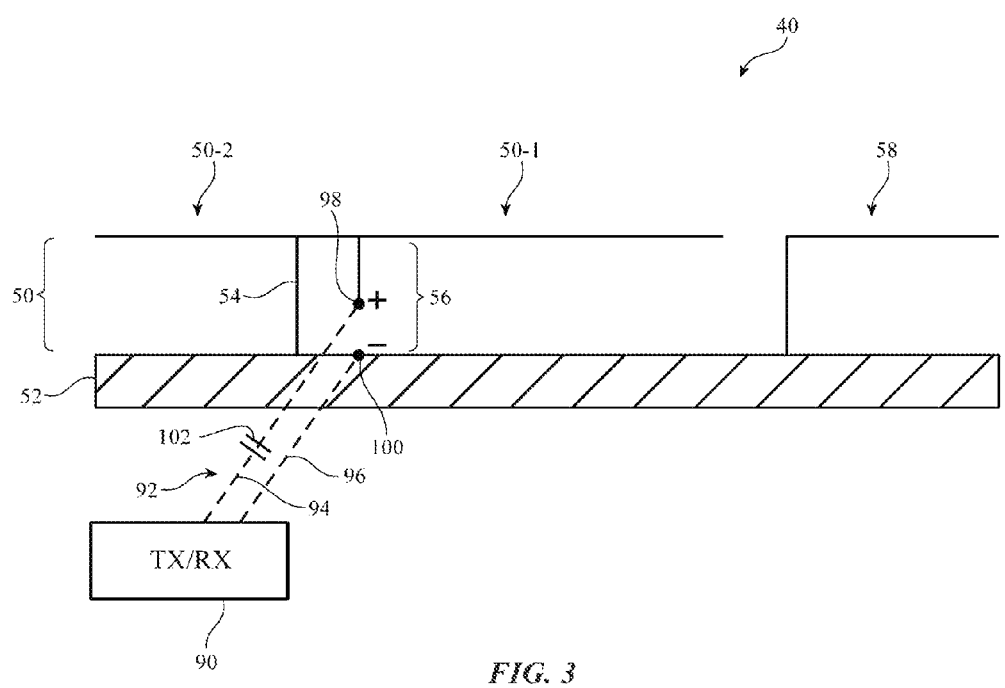
FIG. 3 is a perspective view of an illustrative antenna and associated transceiver circuitry that may be used in an electronic device of the type shown in FIG. 1 in accordance with an embodiment.

If desired, antennas 40 may include one or more inverted-F antennas with parasitic resonating elements. This type of illustrative antenna configuration is shown in FIG. 3. As shown in FIG. 3, antenna 40 may include antenna resonating element 50 and antenna ground 52. Antenna resonating element 50 may have one or more branches such as branches 50-1 and 50-2. Branch 50-1 may handle lower frequencies (e.g., 2.4 GHz) and branch 50-2 may handle higher frequencies (e.g., 5 GHz) or branches 50-1 and 50-2 may resonate in other suitable communications bands. Parasitic antenna resonating element 58 may be an L-shaped metal element that is terminated at ground 52. The presence of element 58 may help broaden the bandwidth of antenna 40 (e.g., in high frequency band such as a 5 GHz band).

Antenna 40 may have a return path such as short circuit path 54 that is coupled between antenna resonating element 50 and ground 52. Antenna feed 56 may have positive antenna feed terminal 98 and ground antenna feed terminal 100 and may be coupled between resonating element 50 and ground 52 in parallel with return path 54.

Transmission line paths such as transmission line 92 may be used to couple antenna structures 40 to transceiver circuitry such as transceiver circuitry 90. Transmission line 92 may have a positive transmission line path such as path 94 that is coupled to positive antenna feed terminal 98 and a ground transmission line path such as path 96 that is coupled to ground antenna feed terminal 100. Transceiver circuitry 90 may operate at wireless local area network bands such as the 2.4 GHz and 5 GHz bands or other suitable short-range or long-range communications bands. Transmission lines in device 10 such as transmission line 92 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired. As an example, a circuit component such as capacitor 102 or other circuitry may be interposed in positive transmission line path 94 or elsewhere within transmission line 92 between transceiver circuitry 90 and antenna 40. Capacitor 102 may help broaden the bandwidth of antenna 40 so that antenna performance is satisfactory over a range of operating conditions for device 10 (e.g., operations at various lid angles for lid 12A relative to base 12B).

Figure 4:
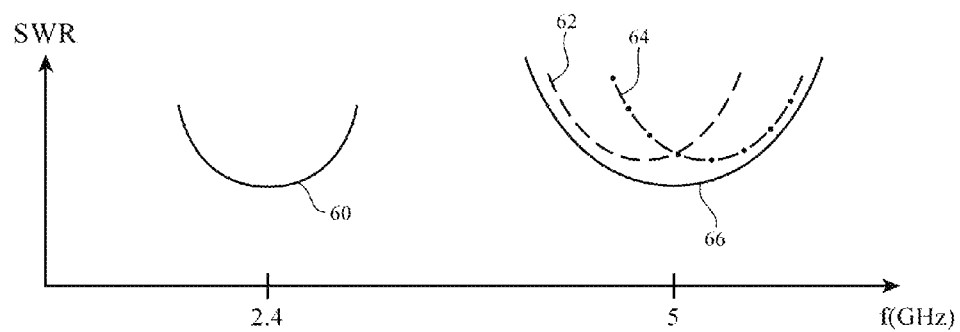
FIG. 4 is a graph in which antenna performance (standing wave ratio SWR) has been plotted as a function of operating frequency for an illustrative antenna of the type shown in FIG. 3 in accordance with an embodiment.

FIG. 4 is a graph in which antenna performance (i.e., standing wave ratio SWR) has been plotted as a function of operating frequency f for antenna 40 of FIG. 3. Curve 60 shows how antenna 40 may operate in a low frequency band such as a 2.4 GHz band (e.g., to support WiFi® or Bluetooth® signals). Low band performance (curve 60) may be supported using low band arm 50-1 of antenna resonating element 50. Curve 62 may correspond to the coverage of antenna 40 that is supported by high band arm 50-2 of antenna 40 (e.g., the response of antenna resonating element 50 at 5 GHz). Curve 64 shows how a slightly shifted high band resonance may be supported using parasitic antenna resonating element 58. Element 50 may be directly feed at antenna feed 56 using transmission line 92. Parasitic element 58 is not directly fed, but rather is coupled to antenna resonating element 50 through electromagnetic near-field coupling. The overall response of antenna 40 in its high band at 5 GHz, which is represented by curve 66, is characterized by both a contribution from antenna resonating element 50 (curve 62) and a contribution from parasitic antenna resonating element 58 (curve 64). The presence of element 58 helps broaden the high band response of antenna 40 to ensure that the high band is covered satisfactorily.

Figure 5:
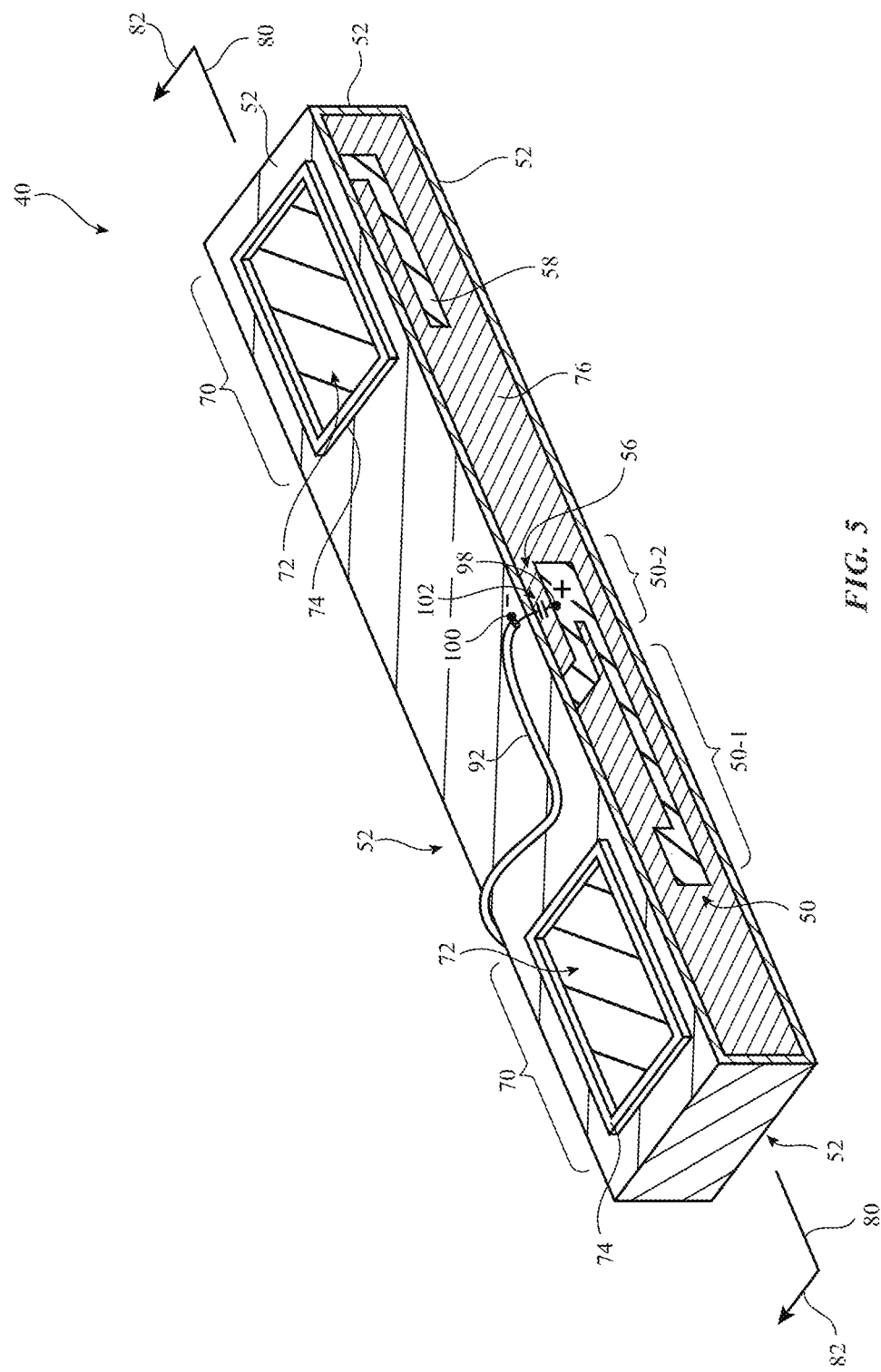
FIG. 5 is a perspective view of an illustrative antenna with a cavity that has been formed from metal traces on a dielectric carrier that also serves as a speaker box in accordance with an embodiment.

Antenna 40 may be formed from metal traces on a dielectric support structure. The dielectric support structure may be formed from ceramic, plastic, foam, glass, other dielectric materials, or combinations of these materials. Illustrative configurations in which the dielectric support structure is plastic support structure may sometimes be described herein as an example. FIG. 5 is a perspective view of an illustrative antenna formed from patterned metal traces on a plastic support (sometimes referred to as an antenna carrier). In the example of FIG. 5, support structure 76 forms an antenna carrier for metal antenna traces. The metal traces may be patterned using laser patterning techniques such as techniques in which selected portions of a plastic surface are activated and become coated with metal during subsequent electroplating operations. If desired, other techniques for forming antenna 40 may be used (e.g., techniques such as machining, attachment of patterned metal foil, mounting of patterned flexible printed circuits, etc.).

In the example of FIG. 5, the metal antenna traces on plastic support structure 76 include traces that form antenna ground 52, antenna resonating element 50, and parasitic antenna resonating element 58. Support structure 76 may be a hollow box-shaped structure or other structure having exterior surfaces surrounding a hollow interior. Structure 76 may be, for example, a six sided box. Metal traces may be patterned on structure 76 so that ground 52 forms a grounded antenna cavity. For example, ground traces 52 may be formed on five of the six sides of the box. The front face of support 76 (in the orientation of FIG. 5) may be free of ground traces and may be used to support metal traces that form antenna resonating element 50 and parasitic element 58, as shown in FIG. 5. In this type of configuration, metal traces 52 form an antenna cavity and antenna 40 is a cavity-backed antenna (i.e., antenna 40 is a cavity antenna). Transmission line 92 may be formed from a coaxial cable that is coupled to antenna 40 at feed 56 (terminals 98 and 100).

In addition to serving as an antenna carrier for antenna 40, support structure 76 may serve as a speaker enclosure (sometimes referred to as a speaker box). As shown in FIG. 5, support structure 76 may serve as a speaker enclosure for a pair of speakers 70. Speakers 70 may be formed from speaker drivers located at opposing ends of structure 76. The interior of structure 76 may be divided into separate volumes for the speakers. Each of speakers 70 may emit sound through a respective one of ports 72. Ports 72 may be covered with a layer of open cell foam, a metal or plastic mesh, or other structures for preventing dust intrusion into the interior of structure 76 or, if desired, ports 72 may have one or more open areas (i.e., areas not covered with mesh) that allow sound to exit speakers 70.

To create a satisfactory acoustic and electrical seal with housing 12, each speaker port 72 may be surrounded by a gasket such as gasket 74. Gaskets 74 may be ring shaped conductive compressible structures. If, for example, speaker ports 72 have rectangular shapes, gaskets 74 may have the shapes of rectangular rings. Gaskets 74 may be formed from one or more layers of conductive foam, conductive fabric, layers that include conductive vias and other conductive structures, conductive adhesive, and other conductive structures that allow gaskets 74 to form acoustic seals around speaker ports 72 while electrically shorting antenna traces such as ground trace 52 to housing 12. The seal formed around speaker ports 72 by gaskets 74 helps prevent dust and sound from entering into the interior of housing 12. Gaskets 74 also help ground antenna ground traces 52 on support structure 76 to metal housing 12, which may serve as a portion of the ground for antenna 40. The presence of conductive gaskets 74 may also help prevent radio-frequency antenna signals that are emitted by antenna 40 from being coupled into the interior of housing 12 as signal noise.

Figure 6:
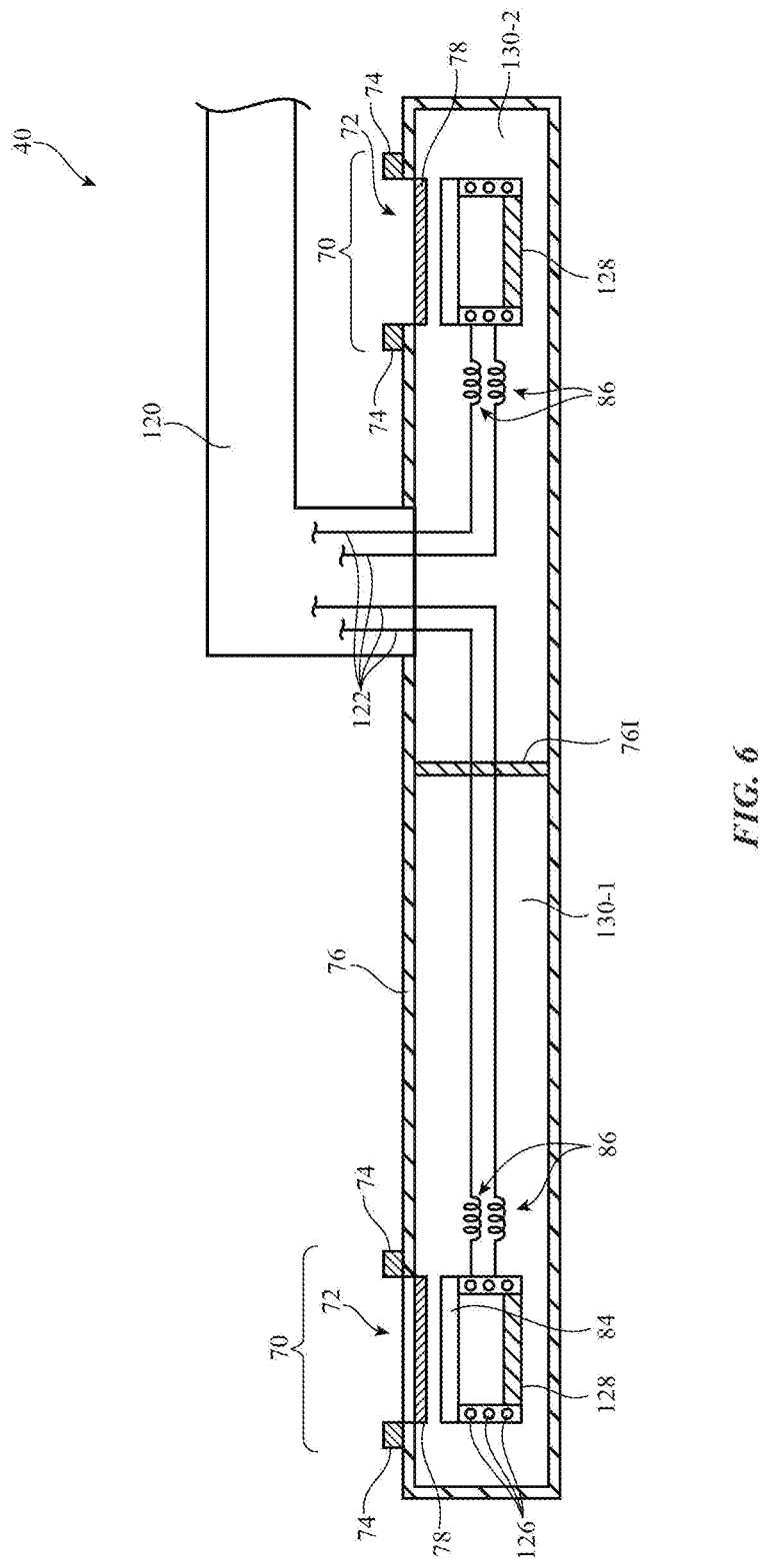
FIG. 6 is a cross-sectional side view of an illustrative cavity antenna such as the cavity antenna of FIG. 5 showing how the interior of the dielectric carrier may serve as speaker volumes for a pair of speakers in accordance with an embodiment.

FIG. 6 is a cross-sectional side view of antenna 40 of FIG. 5 taken along line 80 and viewed in direction 82. As shown in FIG. 6, the interior of hollow support structure 76 may be separated into individual cavities 130-1 and 130-2 by a divider structure such as interior wall 76I. Cavities 130-1 and 130-2 may serve as speaker volumes for respective speakers 70. Each speaker 70 may have a respective speaker driver 128. Speaker drivers 128 may have coils 126, magnets, and other electromagnetic structures that can move diaphragms 84 in response to signals receive over acoustic signal lines 122. This produces sound that is emitted through mesh 78 or other acoustically transparent speaker port material in speaker ports 72. Conductive gaskets 74 may run around the peripheral edges of speaker ports 72 on the upper surface of support 76 (e.g., gaskets 74 may be shorted to metal 52 of FIG. 5).

Signal lines 122 may be routed to carrier 76 on a signal path formed from flexible printed circuit 120 or other suitable signal path structure. If desired, circuit elements such as inductors 86 may be interposed in the signal paths coupled to speaker drivers 128. Inductors 86 may be sized to allow audible frequency signals to pass unimpeded to speaker drivers 84 while blocking high frequency signals such as antenna signals and other radio-frequency signals, thereby reducing unwanted noise in speakers 70. There are two speakers 70 in structure 76 of FIG. 6. More speaker volumes and speakers may be formed in structure 76 or fewer speaker volumes and speakers may be formed in structure 76 if desired. The example of FIG. 6 in which antenna 40 is formed from a hollow antenna carrier structure that includes two speaker drivers is merely illustrative.

If desired, there may be two (or other suitable number) of antennas 40 and four (or other suitable number) of speakers 70 in device 10. As an example, one antenna 40 and an associated set of two speakers may be located on the left half of housing 12B and another antenna 40 and its associated set of two speakers may be located on the right half of housing 12B. Structures 76 may be mounted so that each speaker port 72 is aligned with a corresponding set of speaker openings 28.

Figure 7:
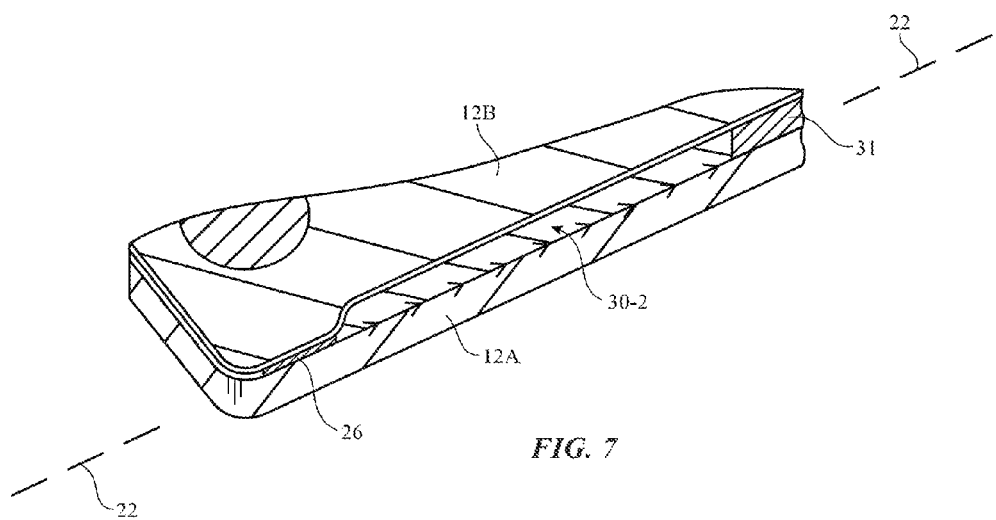
FIG. 7 is a perspective view of a rear edge portion of an illustrative laptop computer showing how a slot-shaped opening may be present through which antenna signals may pass when the lid of the laptop computer is closed in accordance with an embodiment.

Slots 30-1 and 30-2 may serve as antenna apertures for respective cavity antennas 40 (e.g., antennas that are each formed using a structure such as structure 76 of FIG. 6). Slots 30-1 and 30-2 may be present in both open-lid and closed-lid configurations for device 10. An illustrative open-lid configuration in which slots 30-1 and 30-2 are present is shown in FIG. 1. An illustrative rear view of housing 12 showing how a slot such as slot 30-2 may be present in a closed-lid configuration for device 10 is shown in FIG. 7. As shown in FIG. 7, slots 30 such as slot 30-2 may have an elongated shapes that extend parallel to axis 22. During antenna operation, wireless antenna signals that have been transmitted by antennas 40 and wireless antenna signals that are being received by antennas 40 may pass through the antenna apertures formed by slots 30-1 and 30-2.

Figure 8:
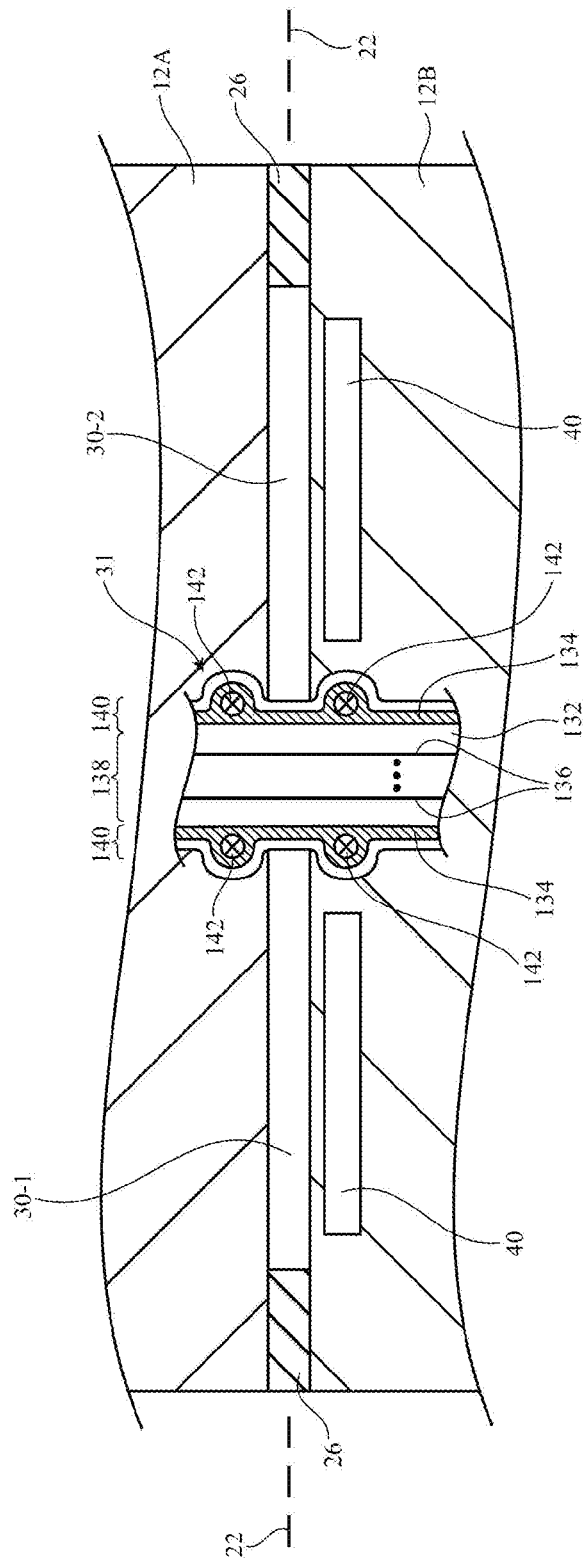
FIG. 8 is a top view of an illustrative interior portion of a laptop computer showing how antennas may be located on either side of the computer housing and may operate through slot apertures that are isolated from each other by ground traces on the edges of flexible printed circuit structures in accordance with an embodiment.

As shown in the illustrative interior view of device 10 of FIG. 8, antennas 40 may be aligned with the apertures formed by slots 30-1 and 30-2 (i.e., the right-hand antenna 40 may be aligned with slot 30-2 and the left-hand antenna 40 may be aligned with slot 30-1). Flexible printed circuit(s) 31 may include one or more flexible printed circuits such as a camera flexible printed circuit that carries camera signals, one or two or more than two display flexible printed circuits that carry display data, one or more backlight unit flexible printed circuits that carry power and control signals for a backlight in display 14, and/or other flexible printed circuits (e.g., a touch sensor flexible printed circuit that carries touch sensor signals for display 14).

Antennas 40 are preferably isolated from each other (e.g., to optimize MIMO operation). Flexible printed circuit(s) 31 may contain one or more sheets of flexible dielectric substrate material such as a layer of polyimide or a sheet of other flexible polymers (substrate 132). Signal lines 136 may be formed in central region 138 of circuit(s) 31. The left and right edges 140 of flexible printed circuit(s) 31 that border region 138 and lines 136 may contain ground traces 134. The width of ground traces 134 may be 1-2 mm, more than 1 mm, less than 3 mm, or other suitable thickness. Ground traces 134 may have screw hole openings that receive metal screws 142. Metal screws 142 may be received within threaded openings in housings 12A and 12B, thereby grounding ground traces 134 to the upper and lower portions of housing 12. The presence of these grounded metal traces in circuit(s) 31 helps divide slot 30 into separate electromagnetically isolated antenna apertures (slots 30-1 and 30-2). This helps ensure that the right and left antennas 40 of device 10 operate independently.

Figure 9:
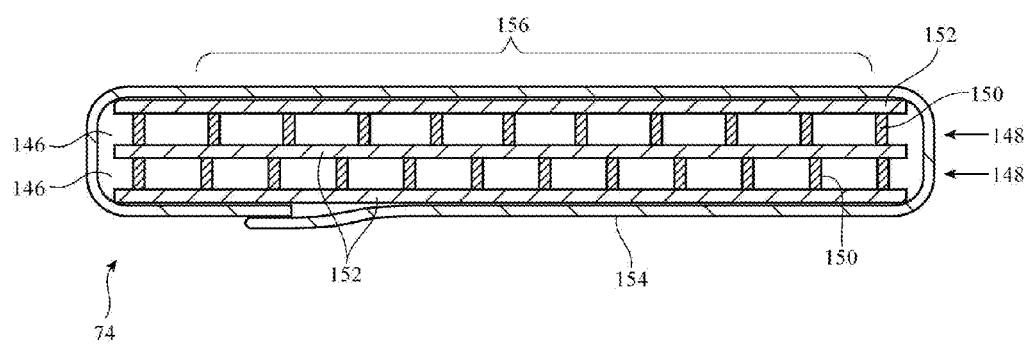
FIG. 9 is a side view of an illustrative stack of conductive gasket materials that may be used in forming a conductive gasket in accordance with an embodiment.

Gaskets 74 may be formed from conductive foam, conductive fabric, and/or other conductive structures (i.e., elastomeric structures that can expand outwardly against nearby structures after being compressed). An illustrative cross-sectional side view of conductive foam structures that may be used in forming gaskets 74 is shown in FIG. 9. As shown in FIG. 9, gasket 74 may be formed from one or more foam layers such as layers 148 that are coupled together in a stack. An opening such as opening 156 (e.g., a rectangular opening formed within a stack of rectangular foam layers) may be used to shape the layers into a structure that serves as gasket 74. (In the diagram of FIG. 9, the material in opening region 156 has not yet been removed.)

Foam layers 148 may each include foam substrate layers 146. The foam of layers 146 may be a closed cell foam that helps ensure that gasket 74 can serve as an acoustically isolating gasket for surrounding speaker port 74. Closed cell foam does not have openings that pass through the body of the foam, so closed cell foam effectively blocks sound. However, the presence of the cell walls in a closed cell foam can make it challenging to deposit metal or other conductive material into the foam in a way that forms current paths through the foam. Accordingly, foam layers 146 may be provided with metal vias such as vias 150 that pass through the closed cell foam. Metal vias 150 render layers 148 conductive (i.e., layers 146 with vias 150 serve as conductive foam layers in gasket 74). Conductive adhesive layers 152 may be used to couple one, two or more, or three or more of layers 148 together and to conductive fabric 154. The number of layers 148 to be used in gasket 74 may be determined by the desired thickness of gasket 74. Layers 148 may be 0.5 mm thick, more than 0.5 mm thick, less than 0.5 mm thick, etc. Fabric 154 may be wrapped around some or all of the exterior surfaces of layers 148 to increase the conductivity of gasket 74. Conductive fabric 154 may be formed from metal fibers, metal coated plastic fibers, fibers treated with metal particles and/or other conductive materials, etc. If desired, layers 148 may be formed from open cell plastic foam plated with metal or other suitable conductive elastomeric structures. The use of closed cell foam with metal vias to form gasket 74 is merely illustrative.

Figure 10:
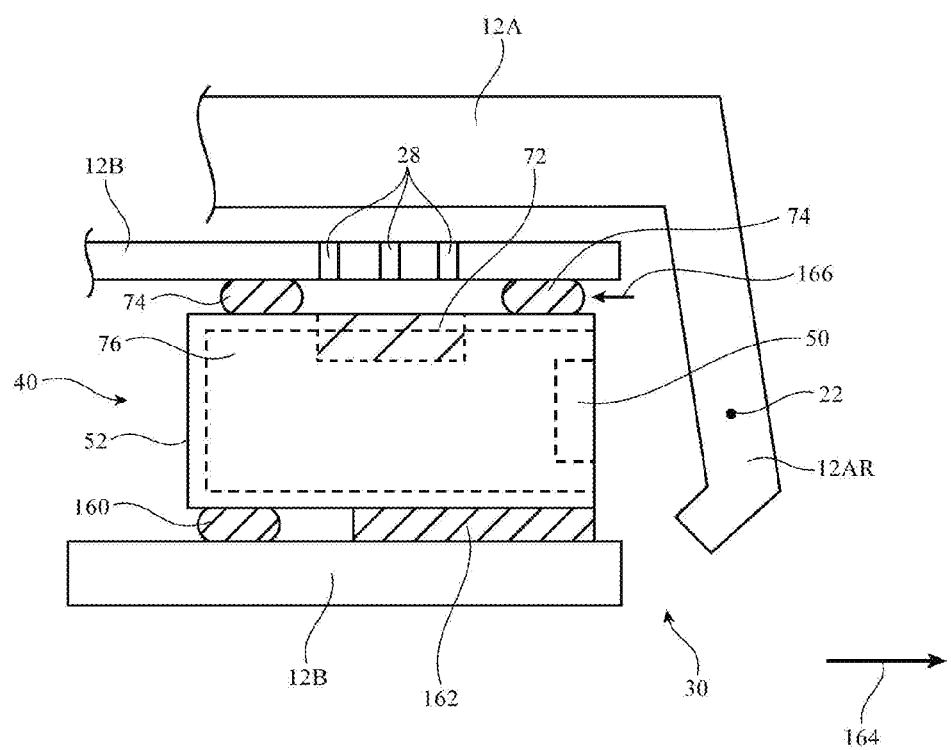
FIG. 10 is a cross-sectional side view of an illustrative laptop computer showing how an antenna may be grounded using a conductive speaker gasket and may operate through a slot aperture between a lid and base housing for the laptop computer when the lid is in a closed position in accordance with an embodiment.

A cross-sectional side view of antenna 40 mounted in an illustrative location within housing 12 in alignment with slot 30 (e.g., slot 30-1 or slot 30-2) is shown in FIG. 10. As shown in FIG. 10, antenna resonating element 50 and the front face of dielectric support structures 76 may face slot 30 in direction 164 so that antenna signals from antenna 40 may pass through slot 30. Conductive structures such as structures 160 and 162 may be used to ground antenna ground trace 52 of antenna 40 to metal lower housing 12B. Structure 162 may be a layer of conductive adhesive or other conductive material. Structure 160 may be a conductive foam layer that helps press antenna 40 upwards so that gasket 74 is compressed between ground 52 on the upper surface of carrier 76 and the opposing lower surface of the upper portion of metal lower housing 12B. The opening in the center of gasket 74 is preferably aligned with speaker openings 28 in housing 12B and with speaker port 72. Aligning speaker 70 with the housing speaker ports formed from openings 28 allows sound from speaker port 72 to exit device 10 (e.g., when lid 12A is open). Gasket 74 forms an acoustic seal around speaker port 72 and prevents sound from leaking into the gap between antenna 40 and housing 12B. Gasket 74 also forms a conductive path that shorts antenna ground 52 of antenna 40 to the underside of the upper portion of housing 12B, thereby preventing antenna signals from entering into the interior of housing 12B via path 166. This helps ensure that antenna signals being transmitted by antenna 40 will not interfere with circuitry in the interior of device 10 such as display circuitry for display 14, control circuitry 30, etc.

Figure 11:
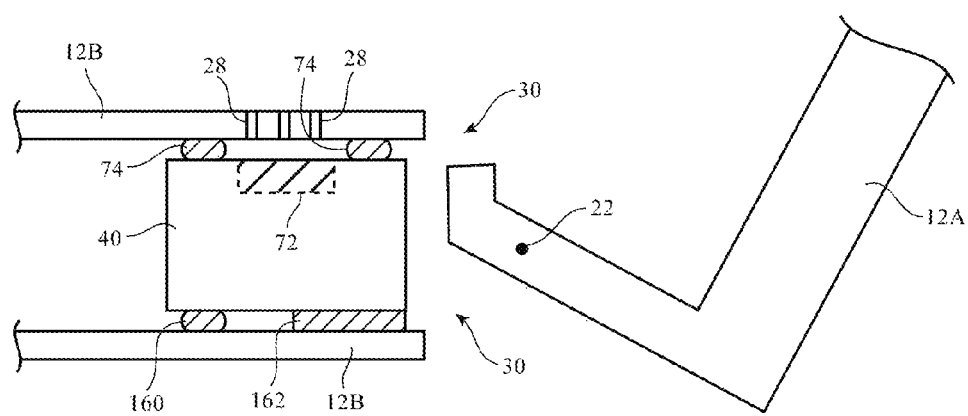
FIG. 11 is a cross-sectional side view of an illustrative laptop computer showing how an antenna may be grounded using a conductive speaker gasket and may operate through a pair of slot apertures between a lid and base housing for the laptop computer when the lid is in an open position in accordance with an embodiment.

Upper housing 12A may have a rear portion such as portion 12AR that is separated from lower housing 12B by a sufficient amount when device 10 is in a lid-closed configuration to form gap 30 and thereby allow antenna 40 to transmit and receive wireless signals. FIG. 11 shows device 10 in an illustrative lid-open configuration in which upper housing (lid) 12A has been rotated into an open position about hinge axis 22. In the illustrative configuration of FIG. 11, slot 30 has upper and lower portions (in addition to the left and right portions located at different positions along axis 22). Antenna signals can pass through either the upper portion of slot 30, through the lower portion of slot 30, or through both upper and lower slots 30 of FIG. 11. With this type of arrangement, each antenna is associated with a pair of antenna apertures (i.e., the upper slot and lower slot). If desired, each antenna may operate through a single slot in both the open and closed lid position. The illustrative configuration of FIG. 11 in which the open lid position for device 10 creates a pair of slot apertures for each antenna is merely illustrative.

Figure 12:
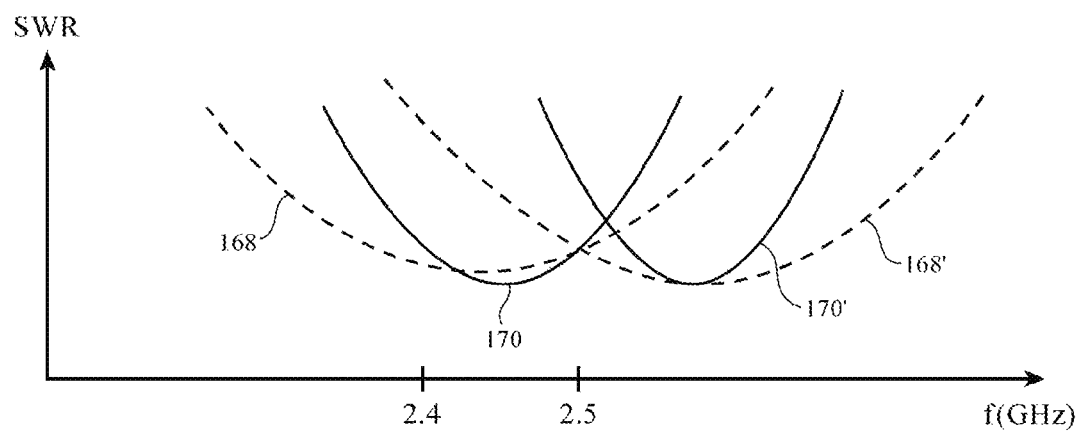
FIG. 12 is a graph in which antenna performance (standing-wave ratio SWR) has been plotted as a function of frequency to show how antenna bandwidth may be enlarged to accommodate potential detuning during operation in accordance with an embodiment.

The varying position of housing 12A with respect to antenna 40 can impose a variable impedance loading onto antenna 40. As a result, antenna performance can be detuned as the position of housing 12A is adjusted by a user (e.g., to optimize viewing of display 14 in housing 12A). This effect is illustrated by the graph of FIG. 12 in which antenna performance (standing wave ratio SWR) has been plotted as a function of operating frequency fin an illustrative communications band of interest at 2.4 GHz. The curves of FIG. 12 illustrate the impact of incorporating capacitor 102 into the signal path between transceiver 90 and antenna 40 and illustrate the impact of lid position. Curve 170 illustrates the performance of antenna 40 in a configuration in which lid 12A is open at an angle of 110° with respect to horizontal and in which capacitor 102 has been omitted. Curve 170' shows how antenna performance for this type of antenna arrangement can be detuned when lid 12A is closed (i.e., oriented at 0°). Curve 168 corresponds to operation of antenna 40 in a configuration in which capacitor 102 is present and lid 12A is in an open position at 110°. In the presence of capacitor 102, the bandwidth of antenna 40 is broadened as illustrated by the broadened shape of antenna resonance curve 168 relative to the shape of curve 170. The broadening impact of capacitor 102 ensures that antenna 40 will continue to operate satisfactorily at a desired frequency in the 2.4 GHz band even when lid 12A is closed (curve 170').

Figure 13:
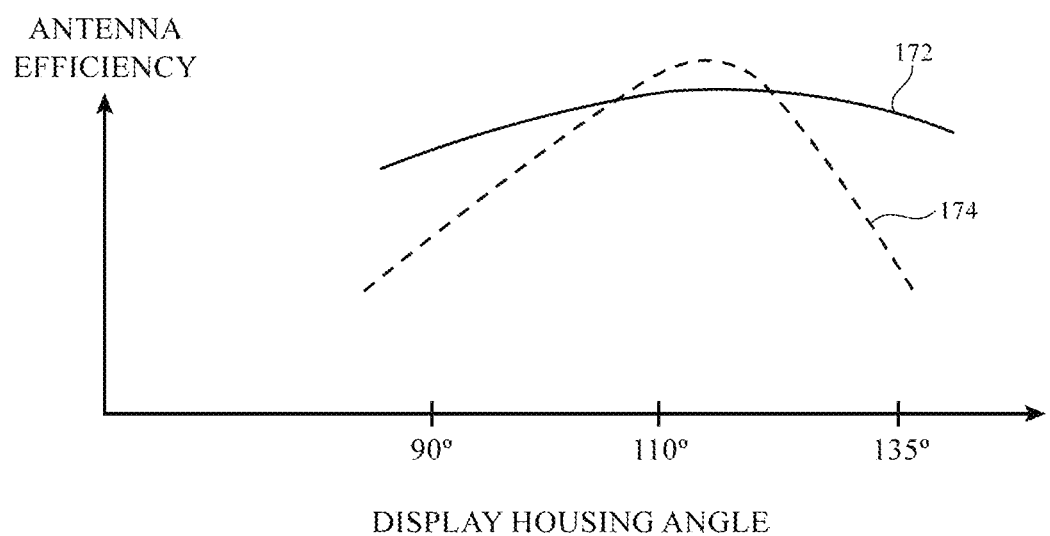
FIG. 13 is a graph in which antenna efficiency has been plotted as a function of lid angle for different antenna configurations in accordance with an embodiment.

In the illustrative graph of FIG. 13, antenna efficiency has been plotted as a function of lid position (i.e., the position of housing 12A relative to housing 12B). Curve 174 corresponds to an antenna arrangement in which capacitor 102 has been omitted. Curve 172, which exhibits reduced lid position sensitivity, corresponds to an antenna arrangement in which capacitor 102 has been included.

As the examples of FIGS. 12 and 13 illustrate, the use of capacitor 102 helps to reduce the susceptibility of antenna 40 to lid position detuning effects. If desired, other lid-detuning-susceptibility-reduction circuits may be coupled between transceiver 90 and the feed for antenna 40. The use of capacitor 102 to broaden the response of antenna 40 and thereby reduce the impact of antenna detuning is merely illustrative.

Another way in which to reduce the sensitivity of device 10 to lid-position-induced antenna detuning involves monitoring the performance of antenna 40 and/or the position of lid 12A using monitoring circuitry (e.g., impedance monitoring circuitry, received-signal-strength monitoring circuitry, etc.). Antenna 40 can be provided with tunable circuitry that can retune the antenna and thereby ensure that antenna performance does not vary more than desired.

Figure 14:
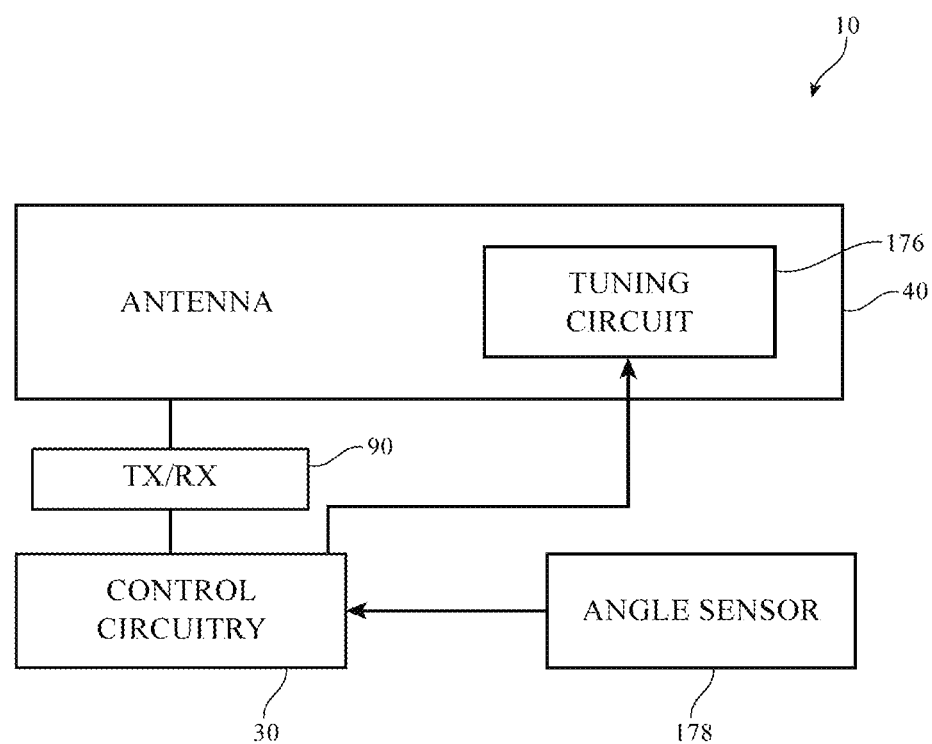
FIG. 14 is a schematic diagram showing how an antenna may have a tuning circuit that is adjusted based on lid angle in accordance with an embodiment.

Consider, as an example, the arrangement of FIG. 14. As shown in FIG. 14, device 10 may have an antenna with tuning circuitry. Tuning circuitry 176 of antenna 40 may include adjustable inductors, adjustable capacitors, and/or other adjustable circuitry. Tuning circuitry 176 may be incorporated into antenna resonating element 50, a portion of antenna ground 52, a parasitic element, an antenna feed structure, an impedance matching circuitry, or other wireless circuitry. Control circuitry 30 may provide data to transceiver circuitry 90 when it is desired to transmit this data using antenna 40 and may process wireless data that has been received by transceiver circuitry 90 using antenna 40. Control circuitry 30 may also receive data from an antenna performance monitoring circuit and/or lid position sensor 178 (e.g., an optically, magnetically, or electrically encoded angle sensor coupled between housings 12A and 12B). Based on information on the position of lid 12A or other information on the state of antenna 40, control circuitry 30 can adjust tuning circuit 176 to ensure that antenna 40 is performing as desired.

Figure 15:
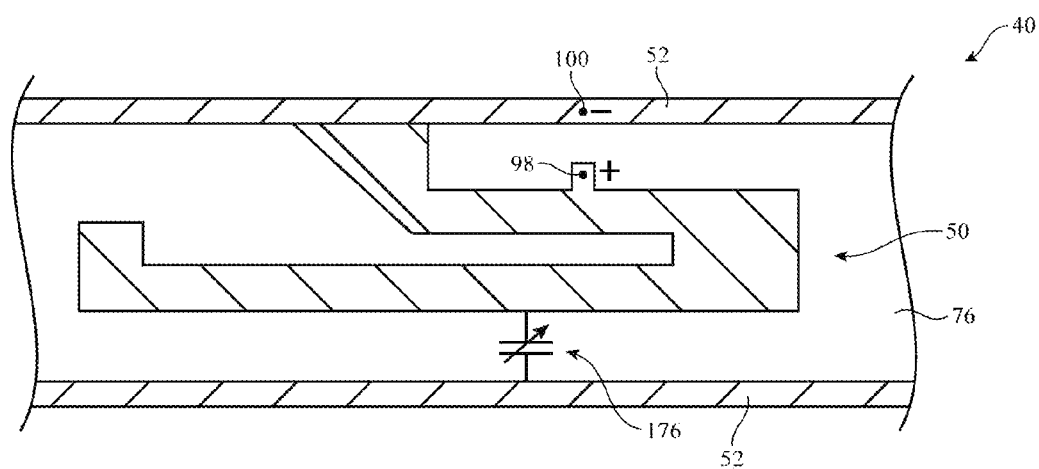
FIG. 15 is a diagram of an illustrative tunable cavity antenna that may be tuned based on sensed lid angle in accordance with an embodiment.

FIG. 15 is a diagram showing how tunable circuitry such as tuning circuit 176 can be implanted using a variable capacitor coupled between antenna resonating element 50 and antenna ground 52. Other types of tuning circuit (e.g., tunable inductors, etc.) can also be used. The tuning configuration of FIG. 15 is merely illustrative.

Figure 16:
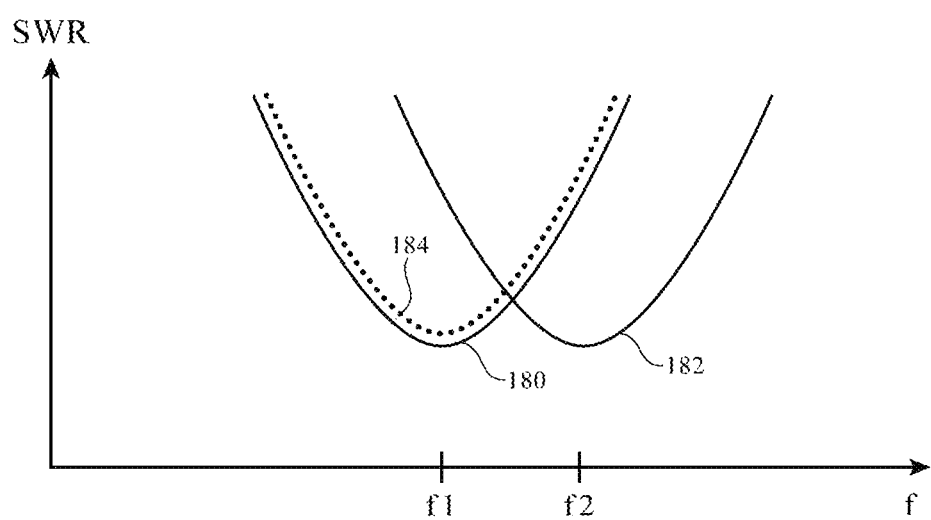
FIG. 16 is a graph in which antenna performance (standing-wave ratio SWR) has been plotted as a function of frequency under different operating conditions and tuning settings in accordance with an embodiment.

FIG. 16 is a graph illustrating how tunable circuitry 176 may be adjusted based on information such as measured lid position. Initially, antenna 40 may be operated at desired frequency f1 with lid 12A in a first position. Upon moving lid 12A to a second position, antenna 40 has the potential to become detuned, as indicated by detuned antenna resonance 182 at undesired frequency f2. By using an a lid position sensor such as angle sensor 178 or other sensor that is sensitive to the position of lid 12A relative to housing 12B, control circuitry 30 can determine that antenna 40 has the potential to be detuned and therefore can adjust tuning circuit 176 by an appropriate amount to compensate. This retunes antenna 40 so that antenna 40 exhibits an antenna resonance such as resonance 184 at desired frequency f1 (even though lid 12A has been moved).

In general, antenna 40 may be retuned by control circuitry 30 based on data from transceiver 90 (e.g., received signal strength or other suitable metric), based on information form a proximity sensor, touch sensor, accelerometer, compass, or other sensor in device 10, based on information from a lid angle sensor, etc. The illustrative configuration of FIG. 14 in which angle sensor 178 is used to provide control circuitry 30 with information for adjusting tunable circuitry 176 is merely illustrative.

The foregoing is merely illustrative and various modifications can be made by those skilled in the art without departing from the scope and spirit of the described embodiments. The foregoing embodiments may be implemented individually or in any combination.

What is claimed is:

1. A portable computer, comprising:
 a housing having an upper metal housing that contains a display and having a lower metal housing that contains a keyboard;
 hinges that connect the upper metal housing to the lower metal housing so that the upper metal housing rotates relative to the lower metal housing about a rotational axis between a closed position and an open position;
 first and second cavity antennas mounted in the lower metal housing between the hinges, wherein the first and second cavity antennas have conductive grounded portions that form first and second respective antenna cavities for the first and second cavity antennas; and
 first and second conductive gaskets that short the first and second antenna cavities to the lower metal housing.

2. The portable computer defined in claim 1 further comprising plastic structures and metal traces on the plastic structures that have portions that form the conductive grounded portions.

3. The portable computer defined in claim 2 further comprising first and second speakers in the plastic structures.

4. The portable computer defined in claim 3 wherein the upper metal housing has openings that form first and second ports for the first and second speakers, respectively.

5. The portable computer defined in claim 4 wherein the first conductive gasket has a ring shape that surrounds the first port and wherein the second conductive gasket has a ring shape that surrounds the second port.

6. The portable computer defined in claim 5 wherein the first and second cavity antennas are located between opposing upper and lower portions of the lower metal housing and wherein the first and second conductive gaskets short the conductive grounded portions to an inner surface of the upper portion of the lower metal housing.

7. The portable computer defined in claim 1 further comprising:
control circuitry in the lower metal housing; and
a signal path that is coupled between the control circuitry and the display.

8. The portable computer defined in claim 7 wherein the signal path comprises a flexible printed circuit having signal paths surrounded by first and second ground traces.

9. The portable computer defined in claim 8 wherein the first and second ground traces are shorted to the upper metal housing and the lower metal housing.

10. The portable computer defined in claim 9 wherein the first and second cavity antennas are dual band antennas.

11. The portable computer defined in claim 10 wherein the first and second cavity antennas are each configured to operate in communications bands at 2.4 GHz and 5 GHz.

12. The portable computer defined in claim 11 further comprising conductive structures that short the conductive grounded portions to an upper surface of the lower portion of the lower metal housing.

13. The portable computer defined in claim 12 wherein the upper metal housing has a rear metal portion that is separated from the lower metal housing by a slot when the upper metal housing is in the closed position and wherein the first and second cavity antennas receive antenna signals through the slot.

14. A portable computer, comprising:
a housing having an upper metal housing that contains a display and having a lower metal housing that contains a keyboard;
a flexible printed circuit that extends between the upper metal housing and the lower metal housing, wherein the flexible printed circuit has metal traces that are shorted to the upper metal housing and the lower metal housing;
hinges that connect the upper metal housing to the lower metal housing so that the upper metal housing rotates relative to the lower metal housing about a rotational axis; and
first and second cavity antennas mounted in the lower metal housing between the hinges, wherein the first and second cavity antennas have metal traces forming conductive grounded portions that are shorted to the lower metal housing and that form first and second respective antenna cavities for the first and second cavity antennas.

15. The portable computer defined in claim 14 wherein the first and second cavity antennas have inverted-F antenna resonating elements and wherein the metal traces are supported by plastic support structures, the portable computer further comprising first and second speakers in the plastic support structures that are mounted in alignment with first and second sets of openings in the lower metal housing.

16. The portable computer defined in claim 15 further comprising first and second ring-shaped conductive gaskets that short the conductive grounded portions to the lower metal housing in alignment with the first and second sets of openings in the lower metal housing.

17. The portable computer defined in claim 16 wherein the ring-shaped conductive gaskets comprise foam.

18. The portable computer defined in claim 17 wherein the first and second cavity antennas transmit and receive antenna signals in communications bands at 2.4 GHz and 5 GHz.

19. A portable computer, comprising:
a housing having an upper metal housing that contains a display and having a lower metal housing that contains a keyboard and control circuitry;
a flexible printed circuit that extends between the upper metal housing and the lower metal housing, wherein the flexible printed circuit has first and second metal ground traces that are shorted to the upper metal housing and the lower metal housing and has signal traces between the first and second metal ground traces that convey signals between the control circuitry and the display;
hinges that connect the upper metal housing to the lower metal housing so that the upper metal housing rotates relative to the lower metal housing about a rotational axis; and
first and second cavity antennas mounted in the lower metal housing between the hinges, wherein the flexible printed circuit is located between the first and second cavity antennas.

20. The portable computer defined in claim 19 wherein the first and second cavity antennas are formed from metal traces on a plastic speaker enclosure and wherein the metal traces on the plastic speaker enclosure have portions that are shorted to the lower metal housing by conductive structures.

* * * * *